United States Patent
Pedersen et al.

(10) Patent No.: US 10,659,991 B2
(45) Date of Patent: May 19, 2020

(54) BANDWIDTH CONSTRAINED IMAGE PROCESSING FOR AUTONOMOUS VEHICLES

(71) Applicants: Nissan North America, Inc., Franklin, TN (US); United States of America as Represented by the Administrator of NASA, Washington, DC (US)

(72) Inventors: Liam Pedersen, San Francisco, CA (US); Maarten Sierhuis, San Francisco, CA (US); Hans Utz, Campbell, CA (US); Mauro Della Penna, San Francisco, CA (US); Terrence Fong, Moffett Field, CA (US); Mark Allan, Campbell, CA (US); Maria Bualat, San Jose, CA (US); Eric Schafer, Kentfield, CA (US)

(73) Assignees: Nissan North America, Inc., Franklin, TN (US); United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/461,104

(22) PCT Filed: Dec. 6, 2017

(86) PCT No.: PCT/US2017/064808
§ 371 (c)(1),
(2) Date: May 15, 2019

(87) PCT Pub. No.: WO2018/106752
PCT Pub. Date: Jun. 14, 2018

(65) Prior Publication Data
US 2020/0068434 A1    Feb. 27, 2020

Related U.S. Application Data

(60) Provisional application No. 62/430,792, filed on Dec. 6, 2016.

(51) Int. Cl.
*H04W 28/06* (2009.01)
*H04W 4/02* (2018.01)
(Continued)

(52) U.S. Cl.
CPC .......... *H04W 28/06* (2013.01); *G05D 1/0022* (2013.01); *G05D 1/0038* (2013.01);
(Continued)

(58) Field of Classification Search
CPC .... H04W 28/06; H04W 4/029; G05D 1/0022; G05D 1/0038; G06T 1/0007; G06T 3/40;
(Continued)

(56) References Cited

U.S. PATENT DOCUMENTS 4,405,943 A * 9/1983 Kanaly ................. G01S 5/0009
                                                    348/E7.088
4,855,822 A    8/1989 Narendra et al.
(Continued)

FOREIGN PATENT DOCUMENTS

EP    2911410 A2    8/2015
JP    2006203287 A  8/2006
(Continued)

OTHER PUBLICATIONS

Extended European Search Report of corresponding application EP 17879322; completed Jan. 29, 2020; 10 pages.

*Primary Examiner* — David F Dunphy
(74) *Attorney, Agent, or Firm* — Young Basile Hanlon & MacFarlane, P.C.

(57) ABSTRACT

Methods, apparatuses, systems, and non-transitory computer readable storage media for providing bandwidth constrained image processing are described. The disclosed technology determines a data transfer rate of at least one signal received from a vehicle, the at least one signal including state/status data of the vehicle. In response to determining that the data
(Continued)

transfer rate satisfies a data transfer rate criterion, a location of the vehicle and a location of at least one of a plurality of objects that obstruct the at least one signal is determined using the state data and external data associated with the vehicle. The disclosed technology generates optimized state data using the state data and the external data.

20 Claims, 7 Drawing Sheets

(51) Int. Cl.
| | |
|---|---|
| H04L 12/26 | (2006.01) |
| H04L 29/08 | (2006.01) |
| H04W 4/029 | (2018.01) |
| G06T 5/00 | (2006.01) |
| G06T 1/00 | (2006.01) |
| G05D 1/00 | (2006.01) |
| G06T 3/40 | (2006.01) |

(52) U.S. Cl.
CPC .............. *G06T 1/0007* (2013.01); *G06T 3/40* (2013.01); *G06T 5/002* (2013.01); *G06T 5/008* (2013.01); *H04L 43/0894* (2013.01); *H04L 67/12* (2013.01); *H04W 4/029* (2018.02); *G05D 2201/0213* (2013.01); *G06T 2200/16* (2013.01); *G06T 2207/20104* (2013.01)

(58) Field of Classification Search
CPC ..... G06T 5/002; G06T 5/008; H04L 43/0894; H04L 67/12
See application file for complete search history.

(56) References Cited

U.S. PATENT DOCUMENTS

| | | | |
|---|---|---|---|
| 6,385,532 B1 | 5/2002 | Dance et al. | |
| 6,549,846 B1 | 4/2003 | Dance et al. | |
| 8,370,392 B1* | 2/2013 | Hunt | H04Q 9/00 |
| | | | 707/791 |
| 8,908,573 B1 | 12/2014 | Wang et al. | |
| 2007/0153802 A1* | 7/2007 | Anke | H04L 47/10 |
| | | | 370/395.42 |
| 2007/0185646 A1* | 8/2007 | Neugebauer | G07C 5/008 |
| | | | 701/533 |
| 2009/0088924 A1 | 4/2009 | Coffee et al. | |
| 2011/0054689 A1 | 3/2011 | Nielsen et al. | |
| 2011/0228047 A1 | 9/2011 | Markham et al. | |
| 2012/0200703 A1 | 8/2012 | Nadir et al. | |
| 2013/0046968 A1* | 2/2013 | Dinan | H04W 4/029 |
| | | | 713/150 |
| 2014/0307724 A1 | 10/2014 | Ricci | |
| 2015/0244826 A1* | 8/2015 | Stenneth | H04Q 9/00 |
| | | | 709/213 |
| 2016/0025497 A1* | 1/2016 | Baalu | G01C 21/005 |
| | | | 701/430 |
| 2016/0219251 A1* | 7/2016 | Vare | B61L 15/0081 |
| 2016/0358475 A1* | 12/2016 | Prokhorov | G05D 1/0011 |
| 2017/0166217 A1* | 6/2017 | Sbianchi | A61B 5/18 |

FOREIGN PATENT DOCUMENTS

| | | |
|---|---|---|
| JP | 2007304820 A | 11/2007 |
| JP | 2007317222 A | 12/2007 |
| JP | 2008236103 A | 10/2008 |
| JP | 2014071778 A | 4/2014 |
| JP | 2016048552 A | 4/2016 |
| JP | 2016139392 A | 8/2016 |
| JP | 2016181072 A | 10/2016 |
| WO | 03/060416 A1 | 7/2003 |
| WO | 2013161345 | 10/2013 |

* cited by examiner

BANDWIDTH CONSTRAINED IMAGE PROCESSING FOR AUTONOMOUS VEHICLES

CROSS-REFERENCE TO RELATED APPLICATION(S)

This application claims priority to and the benefit of U.S. Provisional Application Ser. No. 62/430,792, filed Dec. 6, 2016, the entire disclosure of which is hereby incorporated by reference.

TECHNICAL FIELD

This application generally relates to image processing, and more particularly to bandwidth constrained image processing for vehicles including autonomous vehicles.

BACKGROUND

Autonomous vehicles can operate without the guidance of an operator including a human vehicle operator. However, there are occasions during which it would be beneficial for a human operator to assume control of an autonomous vehicle or receive data, including images, from the autonomous vehicle. When images based on transmitted data are received remotely, their usefulness is often related to their quality which can in turn depend on the quality of the communication channel through which the images were transmitted. However, providing assistance when the communications channel is unstable or compromised by low bandwidth can be challenging.

SUMMARY

Disclosed herein are aspects, features, elements, implementations, and implementations for bandwidth constrained image processing.

An aspect of the disclosed implementations includes a method for bandwidth constrained image processing, the method comprising: determining, by a signal processing system of a controller apparatus, a data transfer rate of a plurality of signals received from a vehicle, the plurality of signals including state data of the vehicle; in response to determining that the data transfer rate satisfies a data transfer rate criterion, determining, by the signal processing system and using the state data and external data associated with the vehicle, a location of the vehicle and a location of at least one of a plurality of objects that obstruct at least one of the plurality of signals; and generating, by the signal processing system, optimized state data using the state data and the external data.

An aspect of the disclosed implementations includes a controller apparatus comprising: a memory and a processor configured to execute instructions stored in the memory to: determine a data transfer rate of a plurality of signals received from a vehicle, the plurality of signals including state data of the vehicle; in response to determining that the data transfer rate satisfies a data transfer rate criterion, determine, using the state data and external data associated with the vehicle, a location of the vehicle and a location of at least one of a plurality of objects that obstruct at least one of the plurality of signals; and generate optimized state data using the state data and the external data.

An aspect of the disclosed implementations includes a non-transitory computer-readable storage medium including program instructions executable by one or more processors of a controller apparatus that, when executed, cause the one or more processors to perform operations, the operations comprising: determining a data transfer rate of a plurality of signals received from a vehicle, the plurality of signals including state data of the vehicle; in response to determining that the data transfer rate satisfies a data transfer rate criterion, determining, using the state data and external data associated with the vehicle, a location of the vehicle and a location of at least one of a plurality of objects that obstruct at least one of the plurality of signals; and generating optimized state data using the state data and the external data.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
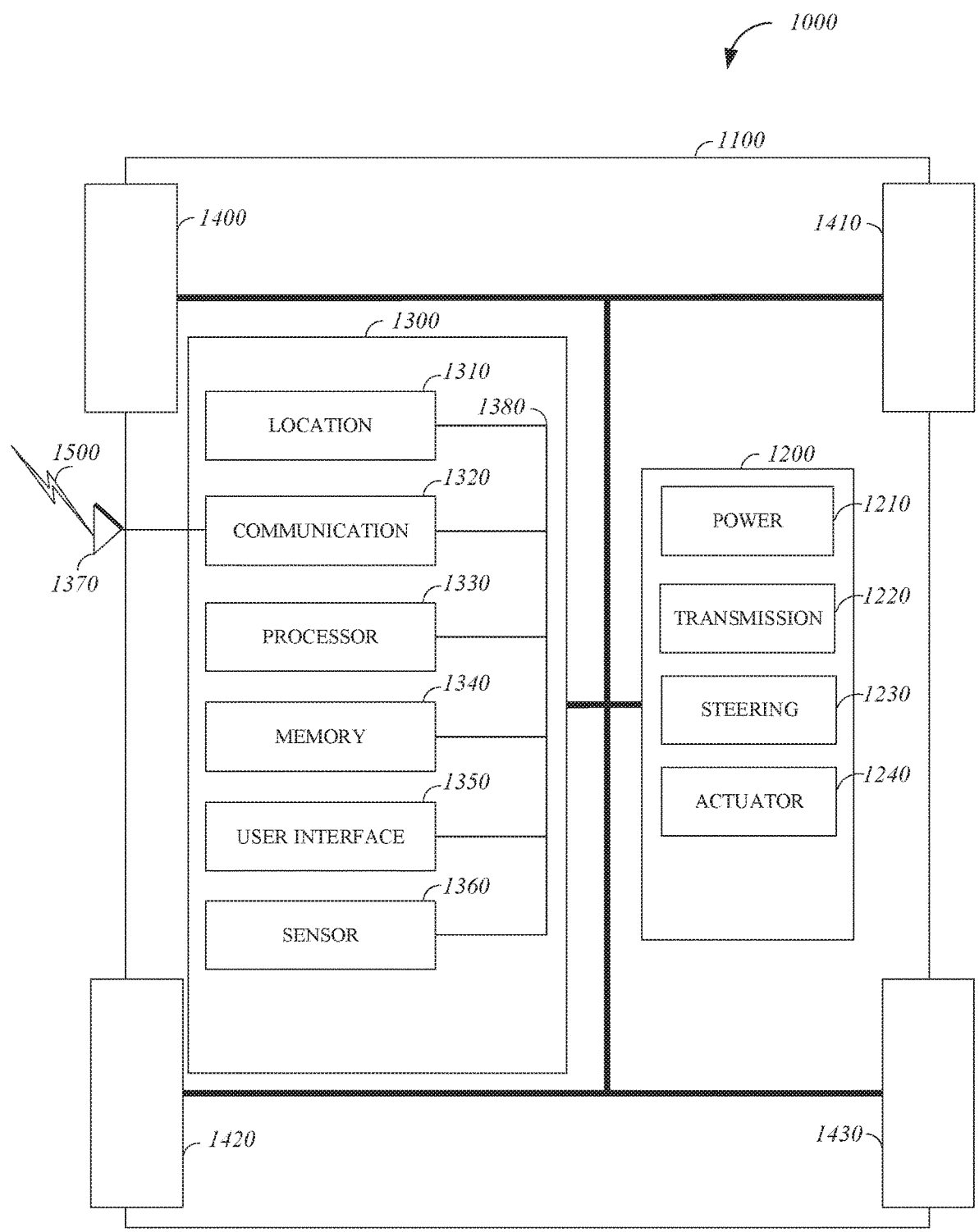
FIG. 1 is a diagram of an example of a portion of a vehicle in which the aspects, features, and elements disclosed herein may be implemented.

The operation (e.g., tele-operation) and monitoring of autonomous vehicles from a remote location, including an autonomous vehicle management center, often entails the use of computing and communication resources (e.g., wireless or wired network bandwidth). The network bandwidth is often used to exchange (send or receive) signals that include data associated with the state of the autonomous vehicles, the state of the environment in which the autonomous vehicles operate (e.g., surrounding roads, city, traffic updates, etc.), or the state of passengers inside the autonomous vehicles.

However, bandwidth is often subject to constraints including excessive demand for bandwidth at various high-peak times (e.g., excessive demand by a fleet of autonomous vehicles during morning commute times) and external factors including network disruptions, signal interference, or obstruction of the signal (e.g., obstruction of the signal by a physical structure such as a building). As such, there is a strong demand for a way to use available bandwidth more effectively so that the disruption of communications and other operations is reduced when bandwidth is constrained. Further, by improving the way in which image data (used to produce visual images) is processed under bandwidth constrained conditions, the ability of vehicle operators and others who rely on visual images to provide assistance to vehicles is facilitated.

For example, when an autonomous vehicle or a passenger inside an autonomous vehicle requests assistance from a remote operator, a communications channel can be established between the operator (e.g., the remote operator at an autonomous vehicle management center) and the autonomous vehicle. The ability of the operator to effectively assist the autonomous vehicle can rely on receiving and/or sending images that accurately represent the disposition of the autonomous vehicle with respect to its surroundings and/or key visual aids.

However, it can be difficult to provide assistance when the communications channel is unstable or compromised by low bandwidth. Existing ways of handling unstable or compromised communications channel are not effective in processing the bandwidth suitable for operations including autonomous vehicle tele-operation.

The present disclosure and implementations of the disclosed technology, provides more effective bandwidth constrained image processing, which can improve the operation of autonomous vehicles. The disclosed technology provides a way to determine when a data transfer rate does not satisfy a data transfer rate criterion (e.g., the data transfer rate is low enough or below a predetermined threshold that results in the images based on image data being excessively degraded and/or not properly delivered/communicated) so that a variety of bandwidth constrained image processing functions can be performed. For example, the functions performed by the disclosed technology include prioritizing data from vehicles based on sensor location and received instructions, providing for the storage and reuse of stored images to generate predictive image data, and providing for the filtering of signals received (including signals that comprise the image and state data associated with the monitored vehicles) for improved image quality.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and autonomous vehicle management, for example, those concerning the extension of computer network components for bandwidth constrained image processing and communication of data between autonomous vehicles and remote operators. The development of new ways of performing bandwidth constrained image processing to, for example, determine a data transfer rate of signals, and prioritize transmittance of sensor data from sensors of a vehicle based on sensor location and bandwidth availability, indicate the communication of instructions or data between a vehicle and a communication system, which is fundamentally related to improving technology related to image processing of autonomous vehicles.

Implementations of this disclosure provide at least a system and method for bandwidth constrained image and data processing of data associated with autonomous vehicles. The system includes a signal processing system that determines a data transfer rate of at least one signal or a plurality of signals that can include state data (e.g., data indicating the state or condition of a vehicle including an autonomous vehicle). State data can also be referred to as status data. In response to determining that the data transfer rate satisfies a data transfer rate criterion (e.g., the rate is falling below a predetermined or desired threshold level or bitrate) a location of a vehicle and external objects (e.g., buildings) that obstruct at least one of the signals can be determined based on the state data and external data that is associated with external objects including but not limited to any of other vehicles, pedestrians, and physical structures such as buildings (i.e., the external data is associated with the external objects that are in the environment of or surround the vehicle being monitored). The system can generate optimized state data (e.g., state data that has been filtered, had noise reduced, or includes predictive data and other types of data) using the state and/or external data which can be used to improve image quality and communications and to generate smoother video when signal bandwidth is constrained due to any of interference and blockage of signals from either the external objects or other sources (e.g., power line malfunctions, internal system issues, vehicle issues, etc.).

To describe some implementations in greater detail, reference is made to the following figures.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
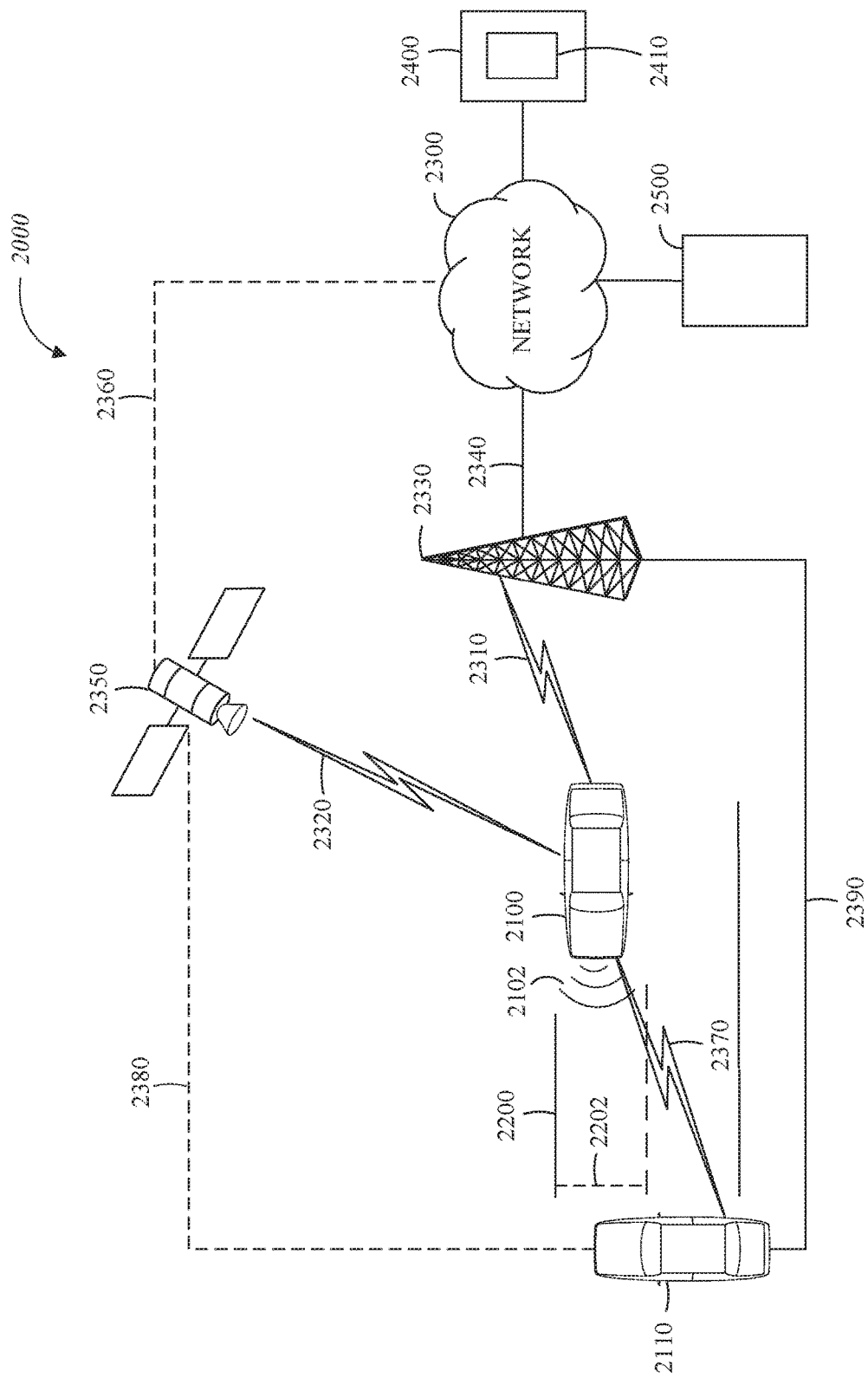
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may tele-operate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
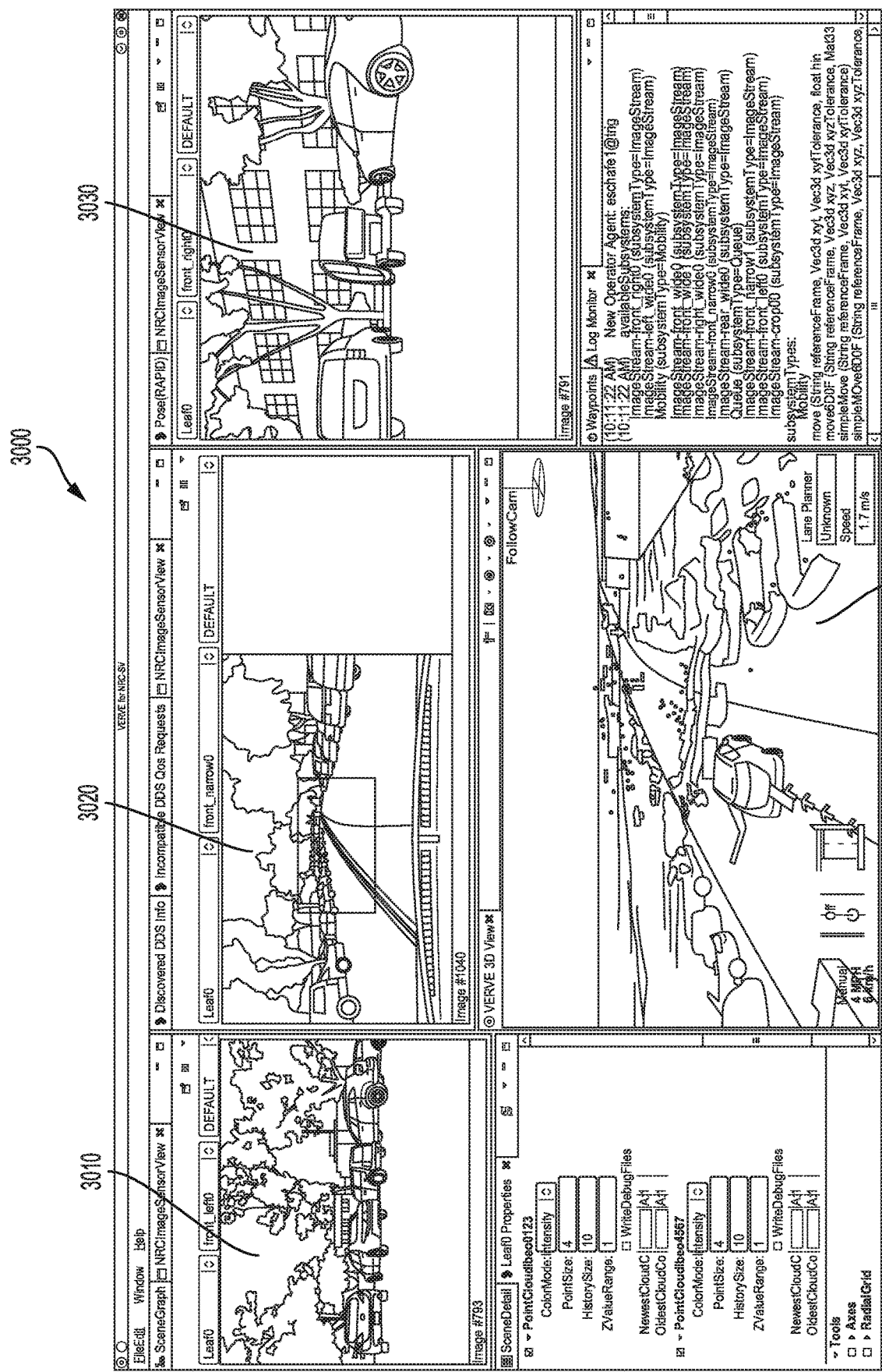
FIG. 3 is a diagram illustrating an example of a bandwidth constrained image processing interface in accordance with the present disclosure.

FIG. 3 is a diagram illustrating an example of a bandwidth constrained image processing interface 3000 in accordance with the present disclosure. The bandwidth constrained image processing interface 3000 can be generated based on one or more instructions that are executable on a computing apparatus, including the controller apparatus 2410 shown in FIG. 2, and which can be stored in a memory of a computing apparatus, including the controller apparatus 2410. For example, the bandwidth constrained image processing interface 3000 can be generated by the controller apparatus 2410, based on instructions that are interpreted by a client computing device that accesses the controller apparatus 2410 through a computer network. The client computing device can then generate a representation of the bandwidth constrained image processing interface 3000 on a display device.

The controller apparatus 2410 can include a plurality of components or modules including but not limited to any of a signal processing system, an image processing system, a filtering module (also referred to as a filter), a machine learning module, and an electronic communication unit (e.g., the electronic communication unit 1320 of FIG. 1). The image processing system can comprise a plurality of components including but not limited to an image processing module, a graphical user interface (GUI), and a data store (i.e., a database). The image processing module can generate the bandwidth constrained image processing interface 3000 which can then be displayed using the GUI for interaction by an operator.

The bandwidth constrained image processing interface 3000 includes a front left view portion 3010, a front center portion 3020, a front right portion 3030, and a simulated view 3040, any of which can be based on data associated with the state of physical objects including any of the vehicle being assisted or tele-operated and objects that are external to the vehicle or in its surrounding environment including but not limited to other vehicles, pedestrians, roadways, and buildings.

View portions including the front left view portion 3010, the front center portion 3020, and the front right portion 3030 can generate output (e.g., images or video streams) from sensors respectively located at the front left, front center, and front right, portion of a vehicle. The vehicle can include a plurality of other sensors located at a plurality of other locations including but not limited to the back left, back center, back right, off-centered locations, on the bottom of the car, and any combination thereof. The contents of the front left view portion 3010, the front center portion 3020, and the front right portion 3030 can include representations of objects that are detected by sensors in the vehicle (e.g., optical sensors such as cameras in the vehicle that detect other cars such as in the in front left view portion 3010).

In some implementations, the view portions can display output that is based on sensors located on or in any part of the vehicle including, any of the outside surfaces of the vehicle, and the interior of the vehicle (e.g., passenger cabin, engine compartment, or cargo space). For example, the front left view portion 3010 can be configured to generate output from a different part of the vehicle such as the rear of the vehicle. The bandwidth constrained image processing interface 3000 can be generated in a display device including any of a display monitor and a heads-up display (e.g., a display projected onto a surface such as the vehicle windshield).

The simulated view 3040 can be based on data relating to the state or condition (e.g., appearance, direction of travel, audio signature) of objects within a predetermined or dynamically generated area (e.g., a geographical area) that includes the vehicle or from a predetermined distance (e.g., 100 feet) of the vehicle. The area can be generated dynamically based on received data such as traffic conditions and nearby accidents. For example, as illustrated in FIG. 3, the objects in the simulated view 3040 can include a vehicle such as the vehicle 2100 shown in FIG. 2. The objects represented in the simulated view 3040 can be generated from different viewpoints or perspectives including as two-dimensional objects (e.g., a top plan view of the vehicle and roadways) or as illustrated in FIG. 3, as a three-dimensional object. Further, the objects displayed in the simulated view 3040 can be generated as a variety of images including but not limited to static images, dynamic images, moving images, a real-time stream of images or video, or any combination thereof. For example, a three-dimensional model of the vehicle can be superimposed on a real-time video stream of the environment surrounding the vehicle.

The features and characteristics of objects within the area represented in the simulated view 3040 can be based on the actual appearance of the objects based on images obtained or received from remote data sources or sensors (e.g., satellite images, vehicle sensor images, traffic signal camera images). Furthermore, the objects within the area represented in the simulated view 3040 can be represented as images including but not limited to abstract indicators or other symbolic representations including icons, text, pictograms, or any combination thereof.

Any part of the bandwidth constrained image processing interface 3000 can receive or detect input to change the sensor from which output is generated (e.g., changing a view portion from displaying a front view to displaying a rear view). The types of inputs that can be received by a portion of the bandwidth constrained image processing interface 3000 include any of visual inputs (e.g., a gesture captured by a camera or motion sensor device), touch inputs (e.g., touching a touch screen such as a resistive display), audio inputs (e.g., commands spoken into a microphone), and inputs from an input device (e.g., pressing a button or turning a knob).

Based on received or detected inputs, the bandwidth constrained image processing interface 3000 can modify the way that images within the bandwidth constrained image processing interface 3000 are represented including but not limited to: magnification of some or all of the images (e.g., increasing the size of a subset of external objects or zooming into the area that is displayed within the view portion 3010); shrinking some or all of the objects, including zooming out from the area that is represented; changing the viewing angle, including changing to an overhead view (e.g., map view); and changing image characteristics of the images including the contrast, saturation, and color depth of the images.

The steps, or operations, of any method, process, or algorithm described in connection with the implementations of the disclosed technology herein, may be implemented in hardware, firmware, software executed by hardware, circuitry, or any combination thereof. To facilitate explanation, the techniques 4000-7000, shown in FIGS. 4-7, are depicted and described as a series of operations. However, the operations in accordance with this disclosure can occur in various orders or concurrently. Additionally, operations in accordance with this disclosure may occur with other operations not presented and described herein.

Figure 4:
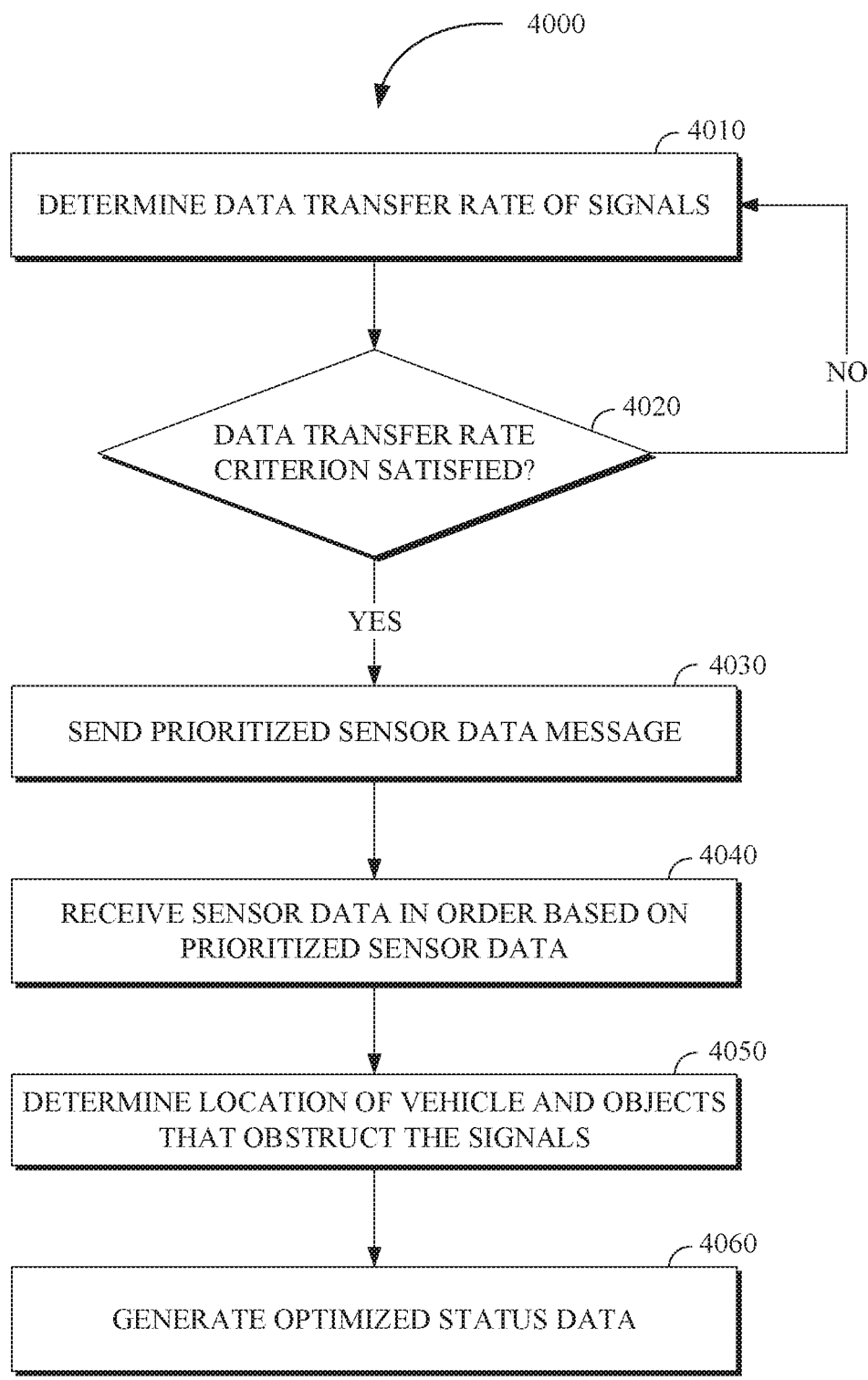
FIG. 4 is a flow chart of a technique for bandwidth constrained image processing in accordance with the present disclosure.

FIG. 4 is a flow chart of a technique 4000 for bandwidth constrained image processing in accordance with the present disclosure. The technique 4000 can be utilized by a vehicle monitoring system that includes but is not limited to at least one fleet manager, vehicle manager, and the aforementioned bandwidth constrained image processing interface 3000 of FIG. 3. Some or all of the technique 4000 for remote support may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include at least a signal processing system, an image processing system, a filter, and an electronic communication system. In an implementation, some or all aspects of the technique 4000 for bandwidth constrained image processing can be implemented in a system (e.g., the controller apparatus 2410 of FIG. 2) combining some or all of the features described in this disclosure.

At operation 4010, a data transfer rate of a signal or signals that include state data of a vehicle is determined by a bandwidth constrained image processing system. In some implementations, the bandwidth constrained image processing system is a controller apparatus (e.g., the controller apparatus 2410). Operation 4010 can be carried out by the controller apparatus (e.g., a signal processing system of the controller apparatus 2410). The signals can include any type of signal that is transmitted or sent between the vehicle and a communication network such as a remote operations center (e.g., the operations center 2400 of FIG. 2) including but not limited to electronic signals (e.g., analog signals or digital signals) that are exchanged (sent or received) directly to or from the vehicle, or indirectly through a communication network. The data transfer rate of the signal can be determined based on a communication system including a communication apparatus that is configured to send signals, receive signals, and determine any of the signal strength, signal frequency, bandwidth, channel capacity, and signal to noise ratio.

The data transfer rate of the signal can include the quantity or amount of data (e.g., the number of bits) that is transferred (sent or received) within a predetermined time period (e.g., a time period of one second). The quantity or amount of data can be measured in units including any of bits, bytes, kilobytes, and megabytes, and the data transfer rate can include the amount of data that is transferred per a unit of time (e.g., one thousand bits per second, or ten terabytes per hour).

The vehicle can include a device or apparatus (e.g., a conveyance) that is used to transport objects including any of one or more passengers and cargo. Furthermore, the vehicle can include a communication system to exchange (send or receive) signals including data (e.g., state data, image data, external data, etc.). The vehicle can include any of an autonomous vehicle, a vehicle that is driven by a human driver, or a semi-autonomous vehicle.

The state data can include, but is not limited to images and other media (e.g., video) that are used to represent the state or condition of the vehicle (e.g., images based on the appearance of the vehicle's exterior and the vehicle's interior) and the external environment (e.g., images based on the appearance of the external environment that includes external objects) in which the vehicle is located, including but not limited to: location data, including imagery of a location of the vehicle such as the geographical location of the vehicle (e.g., the latitude and longitude of the vehicle), imagery of the location of the vehicle with respect to another object, or imagery of the location of the vehicle with respect to a type of area (e.g., a residential zone, a commercial zone, private property, public property); vehicle position data, including imagery to indicate the orientation and inclination (e.g., slope of the vehicle on an incline) of the vehicle; and sensor data based on outputs from sensors that are part of the vehicle, on the vehicle, or inside the vehicle, including, optical sensors (e.g., light detection and ranging sensors), audio sensors and motion sensors the output of which can be symbolically represented by indicators (e.g., hash marks to indicate sound or motion), the sensor data can be used to generate a representation of the physical environment in and around the vehicle; internal state data, including imagery to indicate a temperature (e.g., red for a hotter temperature, blue for a cooler temperature) and humidity inside the passenger cabin (e.g., raindrop indicators can be used to represent very humid conditions) of the vehicle.

At operation 4020, a determination is made with respect to whether a data transfer rate criterion has been satisfied.

Operation 4020 can be carried out by the controller apparatus (e.g., the signal processing system of the controller apparatus 2410 of FIG. 2). The data transfer rate criterion can be based on criteria including any of a data rate transfer threshold (e.g., a minimum data transfer rate), a data rate transfer threshold range (e.g., a range of data transfer rate values which can include values that satisfy the data transfer rate criterion), and historical data rates that meet certain system requirements. The data transfer rate criterion can be satisfied when any of the data transfer rate exceeds, or is less than, the provided data transfer rate criterion.

For example, if the data transfer rate criterion is based on maintaining a data transfer rate threshold of one-hundred kilobytes per second or greater (i.e., which would signify less bandwidth constraints for the system to have to deal with), then a data transfer rate of fifty kilobytes per second would not satisfy the data transfer rate criterion and the system would be alerted to bandwidth constraints based on that comparison. On the other hand, the data transfer rate criterion could be set to be a range below one-hundred kilobytes per second (which would signify potential bandwidth constraints) and a data transfer rate of fifty kilobytes per second would then satisfy this data transfer rate criterion as well. The data transfer rate criterion can include a time factor so that the data transfer rate that is used to determine whether the data transfer rate criterion has been satisfied is sampled from a predetermined time period. For example, the data transfer rate against which the data transfer rate criterion is evaluated could be based on the average data transfer rate over a predetermined time period (e.g., the average kilobytes per second over a ten second time period).

In response to determining that the data transfer rate satisfies the data transfer rate criterion, the technique 4000 proceeds to operation 4030. In response to determining that the data transfer rate does not satisfy the data transfer rate criterion, one or more actions can be performed. In some implementations, the data transfer rate not satisfying the data transfer criterion can cause the technique 4000 to return to operation 4010. In some other implementations, instruction data is sent to the vehicle when the data transfer rate does not satisfy the data transfer rate criterion. The instruction data can include, but is not limited to instructions to be performed by the vehicle (e.g., the autonomous vehicle) or an occupant of the vehicle (e.g., a driver).

The instruction data can include but is not limited to data associated with any of controlling movement of a vehicle, including changing the acceleration, velocity, or direction (e.g., steering), of the vehicle, activating or deactivating (e.g., turning some or all parts of the vehicle on or off) a control system in the vehicle, including mechanical control systems and electrical control systems, activating or deactivating sensors in the vehicle (e.g., activating a camera to view the interior of the vehicle or an area outside the vehicle), activating or deactivating a communication system including any of internal communication systems (e.g., internal speakers directed at vehicle occupants) and external communication systems (e.g., external speakers directed at objects or individuals outside of the vehicle).

Further, the instruction data can include but is not limited to an instruction for the vehicle to stop its movement within a predetermined period of time. For example, if a vehicle was receiving assistance via tele-operation and the image stream from the vehicle was disrupted so that the tele-operator no longer received an intelligible image stream, the vehicle, which could be an autonomous vehicle, could be instructed to seek a safe location to park (e.g., a parking lot or a designated street parking area). In this way, the vehicle can wait in a secure location until the data transfer rate increases, and the image stream from the vehicle is of sufficient quality for the tele-operator to continue providing assistance to the vehicle.

At operation 4030, a message is sent to the vehicle by an electronic communication system (e.g., an electronic communication system of the controller apparatus 2410 of FIG. 2). The message can include a variety of message types such as a prioritized sensor data message. The prioritized sensor data message includes a request for prioritized sensor data from the sensors in the vehicle. The prioritized sensor data message can include any of: the data transfer rate, which can be used in determining a priority of the sensors (e.g., a data transfer rate that is insufficient to transmit high resolution video imagery could be used by the vehicle to assign a higher priority to transmitting still images or lower resolution video imagery); a preferred sensor type (e.g., when the environment is darker, including at night, an infrared sensor can be prioritized higher than an optical sensor that detects visible light); and a preferred state data type which can include a priority ranking of the types of state data, for example, external environment data associated with images of the external environment can be prioritized over vehicle exterior data associated with images of the vehicle's exterior, which could in turn be prioritized over images including symbolic indicators of the temperature or humidity inside the vehicle.

At operation 4040, in response to the request from operation 4030, the sensor data is received by the electronic communication system in an order based on the prioritized sensor data. The sensors in the vehicle can be positioned on any part of the vehicle including any of an outer surface of the vehicle, a passenger cabin of the vehicle, an engine compartment of the vehicle, and a cargo area of the vehicle (e.g., a trunk of an automobile, a flatbed of a flatbed truck). The vehicle can include different types of sensors (e.g., light and motion sensors), and each type of sensor can include multiple sensors.

The prioritized sensor data includes but is not limited to a prioritized listing of the sensors based on any of: the prioritized sensor data message, including any of the data transfer rate and the requested sensor type; locations of the sensors on the vehicle (e.g., sensors inside the vehicle can have higher priority to generate images associated with the state of passengers in the cabin, or sensors at the front of the vehicle can be prioritized over sensors at the rear of the vehicle in order to generate images in the direction of forward travel of the vehicle); a stored sensor prioritization sequence data that can include one or more listings of sensor priority (e.g., in a two optical sensor configuration, the optical sensor at the front of the vehicle can be prioritized over the optical sensor at the rear of the vehicle); and sensor obstruction data relating to the position of the vehicle relative to the objects that obstruct the signals, which can dynamically generate the priority of the sensors based on obstructions (e.g., a vehicle parked with the rear of the vehicle facing a wall and the front of the vehicle facing an open space can dynamically prioritize the sensor at the front of the vehicle over the sensor at the rear of the vehicle).

In some implementations, prioritization of the sensors and the associated image data generated by the sensors can be performed in a proportional way in which higher priority image data is assigned a larger portion of available bandwidth (e.g., a higher bitrate) than lower priority image data which can be assigned a smaller proportion of available bandwidth (e.g., a lower bitrate). In another implementation, the prioritization is based on machine learning techniques (e.g., carried out by the machine learning module of the controller apparatus 2410 of FIG. 2) that utilizes historical data of the tele-operation of other vehicles.

At operation 4050, a location of the vehicle and a location of any potential objects that obstruct the signals being received by the vehicle are determined by the controller apparatus, based on the state data and the external data. The location of the vehicle and the objects can be determined based on the state data including sensor data from the sensors (e.g., images of the location), and location data of the state data (e.g., latitude and longitude). The external data can be accessed from any combination of: a local data source, including a local computing device; and a remote data source including a remote server computing device.

The external data can be associated with the condition or state of objects external to the vehicle which can include but are not limited to any of natural geographic formations, buildings, roadways, walkways, waterways, other vehicles, cyclists, and pedestrians. The external data can include, but is not limited to: object movement path data, including a previously travelled path or predicted path for the objects (e.g., predicted using historical data, operator inputs or instructions, and machine learning techniques), which can be based on any of the objects velocity, orientation, location; object orientation data, including any of an orientation of the objects relative to the vehicle and an orientation such as a compass orientation (e.g., an indication that the object is facing north); object location, including the latitude and longitude of the objects which can be based on satellite (e.g., GPS signals) or other navigational data; sensor data including sensor data based on outputs from sensors in the objects including, optical sensors, audio sensors, and motion sensors, the sensor data can be used to generate a representation (e.g., images) of the physical environment in and around the objects; and object type data including an identification of objects that are able to disrupt or interfere with electronic signals.

The external data can be used to determine the objects that are within a predetermined area of the vehicle that can block, interfere with, or reduce the strength of signals sent to or received from the vehicle. For example, a group of tall buildings, a tunnel, or overpass, could obstruct signals sent from the vehicle, or a factory with a large amount of electromagnetic activity could interfere with the signals sent from the vehicle.

At operation 4060, optimized state data is generated by the controller apparatus based on the external data and the state data, which can include the sensor data. The optimized state data can be generated from portions of the state data and the external data which can be combined in various proportions to form the optimized state data. For example, video imagery from external data could be combined with audio from the state data to form optimized state data that includes synchronized audio and video portions that can be used in real-time or with a small time delay.

The optimized state data can be used to compensate for the data transfer rate not satisfying the data transfer rate criterion, for example, by filtering or bolstering the state data of the vehicle. For example, if bandwidth constraints are detected (e.g., because the data transfer rate is below a minimum threshold level denoted by the data transfer rate criterion), optimized state data can be generated to provide a remote operator with frontal images of the vehicle based on previously stored frontal images of relatively similar locations or time periods or the images garnered from other nearby vehicles that are not experiencing bandwidth constraints. In some implementations, the optimized sensor data can be based on the application of a filter to remove noise from the sensor data. For example, noise can be reduced in images by applying techniques including wavelet transform, anisotropic filtering, linear filters, non-linear filters, and smoothing filters. The filtering techniques can be carried out by a filter of the controller apparatus. Further, the optimized state data can be generated based on modifications to the state data including modifying the type of compression (e.g., utilizing different compression algorithms) or the amount of compression (e.g., applying a greater amount of lossy or lossless compression) of the state data based on the data transfer rate (e.g., a level of compression that is inversely proportional to the data transfer rate).

Figure 5:
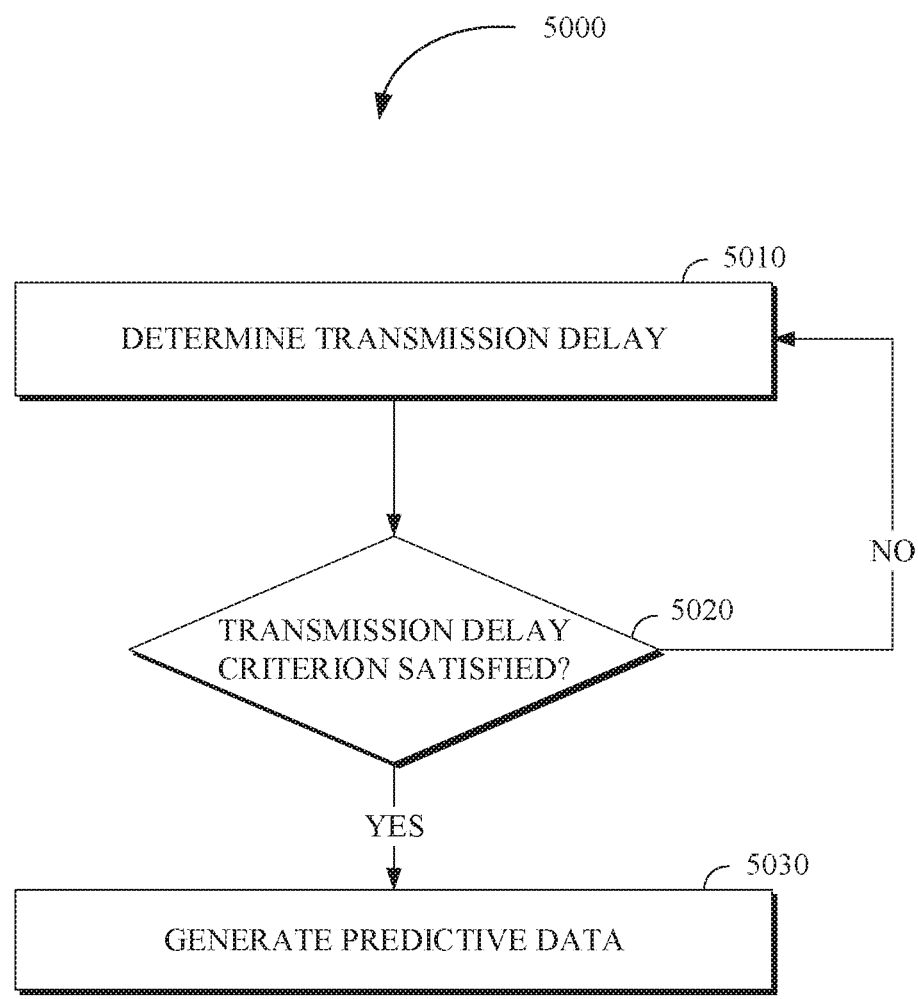
FIG. 5 is a flow chart of a technique for bandwidth constrained image processing in accordance with the present disclosure.

FIG. 5 is a flow chart of a technique 5000 for bandwidth constrained image processing in accordance with the present disclosure. The technique 5000 is utilized by a vehicle monitoring system that includes but is not limited to at least one fleet manager, vehicle manager, and the aforementioned bandwidth constrained image processing interface 300 of FIG. 3. Some or all of the technique 5000 for remote support may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include at least a signal processing system, an image processing system, a filter, and an electronic communication system. In an implementation, some or all aspects of the technique 5000 for bandwidth constrained image processing can be implemented in a system (e.g., the controller apparatus 2410 of FIG. 2) combining some or all of the features described in this disclosure.

At operation 5010, a transmission delay is determined by the controller apparatus based on a time interval between when at least one of the signals stop being received and when at least another of the signals are subsequently received. The start of the time interval can begin when the signals stop being exchanged (receiving or sending) and end when exchange (receiving or sending) of the signals resumes. For example, if a vehicle encountered an obstruction that blocked the signals from the vehicle, the time period would start when the signals from the vehicle could no longer be received and the time period would end when the signals from the vehicle were successfully received.

In some implementations, the transmission delay is based on the signal strength or the data transfer rate falling below a respective signal strength threshold or data transfer rate threshold even if the data is continuously received (so there are no pure delays or stoppages in the flow of the data). In this way, a transmission delay could be determined to occur even when the signal strength or data transfer rate are non-zero.

At operation 5020, in response to determining that the transmission delay satisfies a delay criterion (e.g., that there is a delay of receiving data for 5 seconds and that is greater than the delay criterion threshold of up to 2 seconds which is permitted), the technique 5000 proceeds to operation 5030. The delay criterion can include a range of values and not a threshold. In response to determining that the transmission delay does not satisfy the delay criterion, the technique 5000 returns to operation 5010. Satisfaction of the transmission delay criterion can include but is not limited to any of the transmission delay time exceeding a transmission delay time threshold (e.g., the transmission delay criterion is satisfied when the delay time is greater than a specified transmission delay time), and the number of transmission delays in a predetermined time period exceeding a delay occurrence threshold.

At operation 5030, predictive data is generated by the controller apparatus based on any of the state data and the external data that was previously received within a predetermined time period. The predictive data can include but is not limited to data previously or currently being received by other vehicles in nearby or related locations. The state data and the external data can be analyzed by the machine learning module of the controller apparatus using predictive modelling or machine learning techniques which can then be used to generate predictive data for the time period during which the transmission delay occurs.

For example, if the vehicle is proceeding at a constant velocity of one hundred kilometers per hour on a highway and passes a mountainside that blocks signals from the vehicle, predictive data can be used to generate images (e.g., images of the surrounding environment of the vehicle) based on the velocity of the vehicle (one hundred kilometers per hour) and the estimated location of the vehicle prior to the disruption and the direction of travel. If the vehicle then encounters traffic congestion that causes the vehicle to slow to a velocity of two kilometers per hour, predictive data could be generated based on the new (two kilometers per hour velocity). If a transmission delay coincides with the vehicle entering a two-hundred-meter long tunnel at the last known velocity (two kilometers per hour), the predictive modelling could generate the predictive data to provide the vehicle position inside the tunnel including an estimate of when the vehicle will exit the tunnel which could be based on vehicle's last known velocity and the rate of objects (e.g., other vehicles) exiting the tunnel in the direction the vehicle is travelling.

In some implementations, image data is generated based on the sensor data from any of the state data and the external data. The image data can be stored for future use, for example, in a local storage device or a remote storage device (e.g., stored in a cloud computing system) that can be accessed through a communication network or computing network. The stored image data can then be retrieved when the data transfer rate satisfies the data transfer rate criterion. For example, the image data can be used to generate the predictive data by using image data associated with past locations to reconstruct an image of the location when the data transfer rate is not sufficient for an image of the location to be generated in real time.

Figure 6:
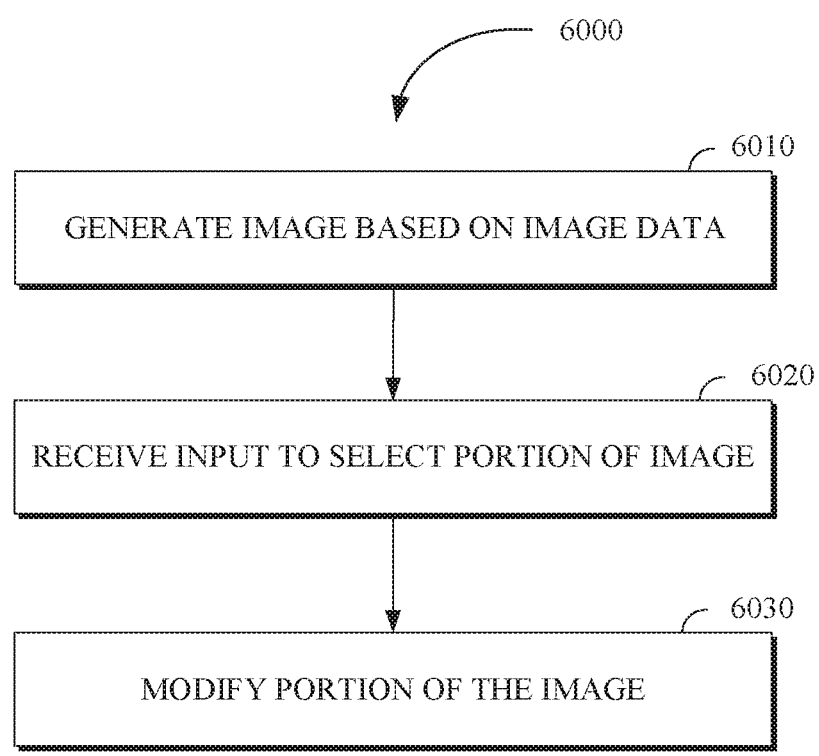
FIG. 6 is a flow chart of a technique for bandwidth constrained image processing in accordance with the present disclosure.

FIG. 6 is a flow chart of a technique 6000 for bandwidth constrained image processing in accordance with the present disclosure. The technique 6000 is utilized by a vehicle monitoring system that includes at least one fleet manager, vehicle manager, and the aforementioned interfaces. Some or all of the technique 6000 for remote support may be implemented in a vehicle including the vehicle 1000 shown in FIG. 1, the vehicle 2100 shown in FIG. 2, or a computing apparatus including a controller apparatus such as the controller apparatus 2410 shown in FIG. 2. The controller apparatus can include at least a signal processing system, an image processing system, a filter, and an electronic communication system. In an implementation, some or all aspects of the technique 6000 for bandwidth constrained image processing can be implemented in a system (e.g., the controller apparatus 2410 of FIG. 2) combining some or all of the features described in this disclosure.

At operation 6010, an image is generated by the controller apparatus based on image data. The image data can be based on the state data or external data and can include representations of a vehicle and objects including pedestrians, other vehicles, roadways, and buildings. The image data can be output to an output device such as a display device that is capable of outputting images (e.g., a monitor or projector). For example, the image data can be represented in an interface including the bandwidth constrained image processing interface 3000 illustrated in FIG. 3.

At operation 6020, a determination of whether an input (e.g., from a remote operator or the driver of the vehicle) to select a portion of the image has been detected is made by the controller apparatus. The determination of whether the input to select the portion of the image has been detected can be based on determining whether any of an optical input (e.g., gazing at a portion of the image), an audio input (e.g., speaking into a microphone to issue a command), a motion input (e.g., making a hand gesture), and a tactile input (e.g., touching a portion of the display on which the image is generated). In response to receiving the input, the technique 6000 proceeds to operation 6030. In response to not receiving the input, the technique 6000 returns to operation 6010.

At operation 6030, the image data is modified or updated or altered (e.g., by a remote operator using the bandwidth constrained image processing interface 3000 of FIG. 3) and received by the controller apparatus. Modifying the image data can result in the modification of the portion of the image that was selected. Modifying the portion of the image that was selected can be based on any modification to the image data that changes the image including but not limited to any of enhancements to the brightness or focus or color or other graphical characteristics of the image, generation of missing portions of the image, magnifying the portion of the image, reducing noise, increasing contrast in a portion of the image, histogram equalization, median filtering, and unsharp mask filtering.

Figure 7:
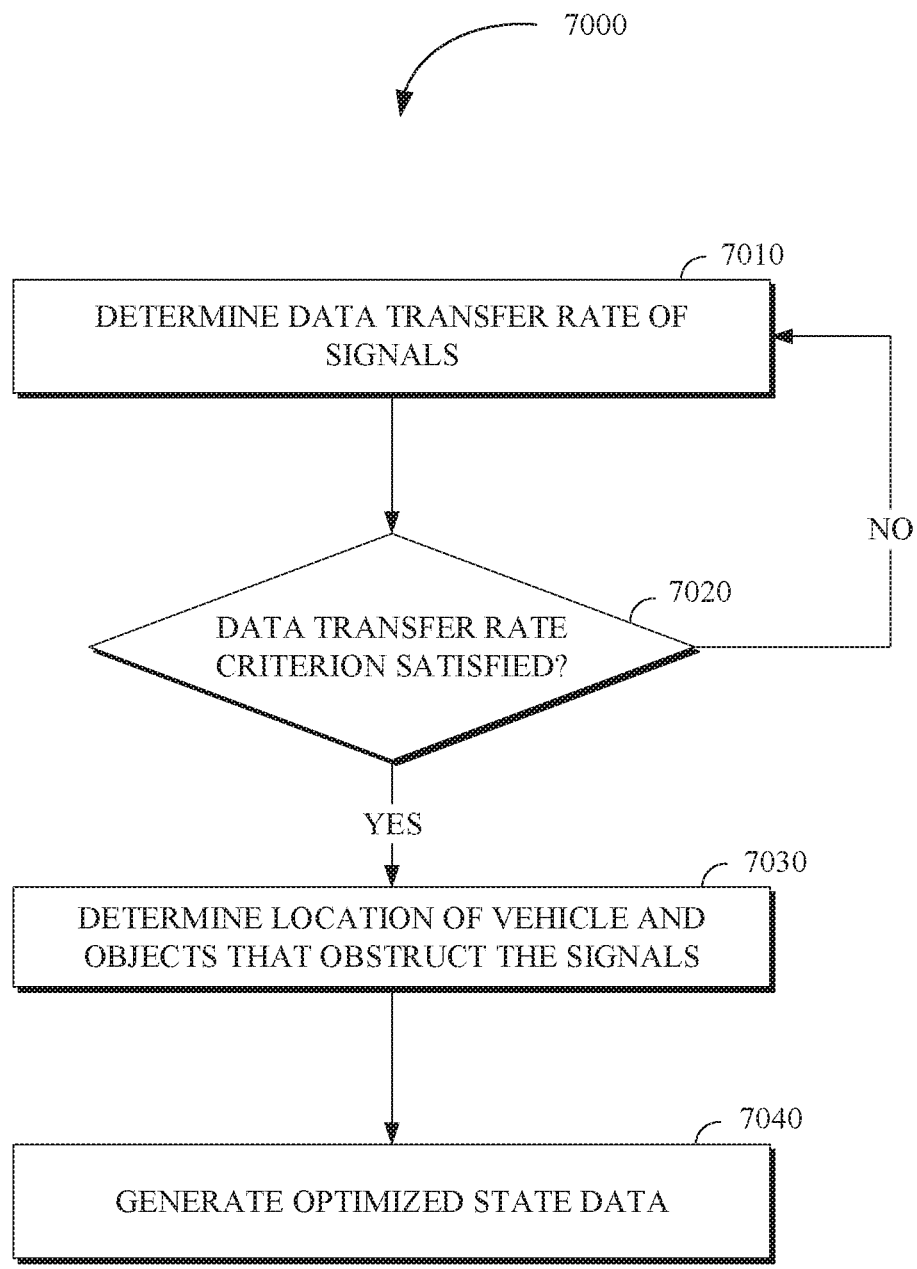
FIG. 7 illustrates a method for bandwidth constrained image processing in accordance with the present disclosure.

FIG. 7 illustrates a method 7000 for bandwidth constrained image processing in accordance with the present disclosure. The method 7000 can be carried out by a system including but not limited to the controller apparatus 2410 of FIG. 2 or various sub-components or sub-modules or subsystems of the controller apparatus 2410. The method 7000 includes determining a data transfer rate of signals that include state data of a vehicle, via 7010. In response to determining that the data transfer rate satisfies a data transfer rate criterion (e.g., the data transfer rate is high enough and above a data transfer rate threshold which indicates the minimum bandwidth necessary to conduct the image processing), determining, based on the state data and external data (e.g., traffic data, image data on external objects around the vehicle, etc.), a location of the vehicle and a location of objects that obstruct at least one of the signals, via 7020. Optimized state data is generated based on the state data and the external data, via 7030. The state data includes sensor data of sensors associated with the vehicle (e.g., sensors within, on top of, under, and/or around the vehicle), wherein the sensors include any of an optical sensor, a light detection and ranging sensor, a motion sensor, and an audio sensor. In an implementation, the method 7000 includes sending a message (e.g., a prioritized sensor data message) that includes a request for prioritized sensor data from the sensors, wherein the prioritized sensor data includes a prioritized listing of the sensors based on locations of the sensors associated with the vehicle. The method 7000 further includes receiving the sensor data in an order based on the prioritized sensor data. The order can list the sensor data using a variety of features including but not limited to from highest priority to lowest priority or largest amount of data to least amount of data.

In an implementation, the method 7000 includes filtering the sensor data using a filter (including but not limited to linear smoothing filters, non-linear filters) to remove noise and artifacts from the sensor data and all of the signals received, wherein the optimized state data is based on or includes the filtered sensor data. The method 7000 includes generating and storing image data based on the sensor data and retrieving the image data when the data transfer rate satisfies the data transfer rate criterion (or when a request marked with a certain important level is received), wherein the optimized state data is based on or includes the image data.

In an implementation, the method 7000 includes generating an image based on the image data. In response to receiving an input to select a portion of the image, the method 7000 includes modifying or updating the portion of the image that was selected, wherein the modifying or updating includes any of magnifying (e.g., zoom in, out) the portion of the image, filtering noise from the portion of the image, increasing contrast in the portion of the image, or altering the portion of the image in any other way.

In an implementation, the method 7000 includes modifying any of a type of compression and an amount of compression that is applied to the state data based on the data transfer rate. The method 7000 includes determining a transmission delay based on a time interval between the signals (including the current state data) being received. In response to determining that the transmission delay satisfies a delay criterion (e.g., the signals are being received in one minute intervals which is beyond the 30-minute threshold or criterion), generating predictive data based on state data previously received within a predetermined time period, wherein the optimized state data is based on or includes the predictive data. In response to determining that the data transfer rate satisfies the data transfer rate criterion, sending instruction data to the vehicle, wherein the instruction data includes any of an instruction for the vehicle to stop or go to a certain location and stop and an instruction for the vehicle to change location to eliminate obstruction of the at least one of the signals by the respective one of the objects.

The disclosed technology provides a bandwidth processing apparatus that more efficiently optimizes image data, including state data that is received from a vehicle (e.g., an autonomous vehicle). The disclosed technology can reduce the downtime resulting from unavailable or poor quality images due to bandwidth constraints caused by factors including obstruction (e.g., obstruction of signals to or from a vehicle that are caused by physical structures or other external objects) and interference (e.g., other signals that interfere with the signals to or from the vehicle).

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, the method comprising:
   determining, by a signal processing system of a controller apparatus, a data transfer rate of a plurality of signals received from a vehicle, the plurality of signals including state data of the vehicle;
   in response to determining that the data transfer rate satisfies a data transfer rate criterion, determining, by the signal processing system and using the state data and external data associated with the vehicle, a location of the vehicle and a location of at least one of a plurality of objects that obstruct at least one of the plurality of signals; and
   generating, by the signal processing system, optimized state data using the state data and the external data.

2. The method of claim 1, wherein the state data includes sensor data of a plurality of sensors associated with the vehicle, wherein the plurality of sensors includes any of an optical sensor, a light detection and ranging sensor, a motion sensor, and an audio sensor.

3. The method of claim 2, further comprising:
   sending, by a communication unit of the controller apparatus, a prioritized sensor data message to the vehicle, the prioritized sensor data message including a request for prioritized sensor data from the plurality of sensors, the prioritized sensor data including a prioritized listing of the plurality of sensors using locations of the plurality of sensors; and
   receiving, by the communication unit, the sensor data from the vehicle in an order using the prioritized listing.

4. The method of claim 2, further comprising:
   filtering, by a filter of the controller apparatus, the sensor data to remove noise from the sensor data, the optimized state data being generated using the filtered sensor data.

5. The method of claim 2, further comprising:
   generating, by an image processing system of the controller apparatus, image data using the sensor data;
   storing, by the image processing system, the image data in a database; and
   retrieving, by the image processing system, the image data when the data transfer rate satisfies the data transfer rate criterion, the optimized state data being generated using the retrieved image data.

6. The method of claim 5, further comprising:
   generating, by the image processing system, an image using the image data; and
   in response to receiving an input to select a portion of the image, modifying, by the image processing system, the portion of the image that was selected, the modifying including any of magnifying the portion of the image, filtering noise from the portion of the image, and increasing contrast in the portion of the image.

7. The method of claim 1, further comprising:
   modifying, by the signal processing system, any of a type of compression and an amount of compression that is applied to the state data using the data transfer rate.

8. The method of claim 1, further comprising:
   determining, by the signal processing system, a transmission delay using a time interval between the plurality of signals being received; and
   in response to determining that the transmission delay satisfies a delay criterion, generating, by a machine learning module of the controller apparatus, predictive data using state data previously received within a predetermined time period, the optimized state data being generated using the predictive data.

9. The method of claim 1, further comprising:
   in response to determining that the data transfer rate satisfies the data transfer rate criterion, sending, by a communication unit, instruction data to the vehicle, the instruction data including any of an instruction for the vehicle to stop and an instruction for the vehicle to change location to eliminate obstruction of the at least one of the plurality of signals by the at least one of the plurality of objects.

10. A controller apparatus, comprising:
a memory; and
a processor configured to execute instructions stored in the memory to:
- determine a data transfer rate of a plurality of signals received from a vehicle, the plurality of signals including state data of the vehicle;
- in response to determining that the data transfer rate satisfies a data transfer rate criterion, determine, using the state data and external data associated with the vehicle, a location of the vehicle and a location of at least one of a plurality of objects that obstruct at least one of the plurality of signals; and
- generate optimized state data using the state data and the external data.

11. The controller apparatus of claim 10, wherein the state data includes sensor data of a plurality of sensors associated with the vehicle, wherein the plurality of sensors includes any of an optical sensor, a light detection and ranging sensor, a motion sensor, and an audio sensor.

12. The controller apparatus of claim 11, wherein the processor is further configured to execute instructions stored in the memory to:
- send a prioritized sensor data message to the vehicle, the prioritized sensor data message including a request for prioritized sensor data from the plurality of sensors, the prioritized sensor data including a prioritized listing of the plurality of sensors using locations of the plurality of sensors; and
- receive the sensor data from the vehicle in an order using the prioritized listing.

13. The controller apparatus of claim 11, wherein the processor is further configured to execute instructions stored in the memory to:
- determine a transmission delay using a time interval between the plurality of signals being received; and
- in response to determining that the transmission delay satisfies a delay criterion, generate predictive data using state data previously received within a predetermined time period, the optimized state data being generated using the predictive data.

14. The controller apparatus of claim 11, wherein the processor is further configured to execute instructions stored in the memory to:
- generate image data using the sensor data;
- store the image data in a database; and
- retrieve the image data when the data transfer rate satisfies the data transfer rate criterion, the optimized state data being generated using the retrieved image data.

15. The controller apparatus of claim 14, wherein the processor is further configured to execute instructions stored in the memory to:
- generate an image using the image data; and
- in response to receiving an input to select a portion of the image, modify the portion of the image that was selected, wherein to modify includes any of magnifying the portion of the image, filtering noise from the portion of the image, and increasing contrast in the portion of the image.

16. A non-transitory computer-readable storage medium including program instructions executable by one or more processors of a controller apparatus that, when executed, cause the one or more processors to perform operations, the operations comprising:
- determining a data transfer rate of a plurality of signals received from a vehicle, the plurality of signals including state data of the vehicle;
- in response to determining that the data transfer rate satisfies a data transfer rate criterion, determining, using the state data and external data associated with the vehicle, a location of the vehicle and a location of at least one of a plurality of objects that obstruct at least one of the plurality of signals; and
- generating optimized state data using the state data and the external data.

17. The non-transitory computer-readable storage medium of claim 16, wherein the state data includes sensor data of a plurality of sensors associated with the vehicle, wherein the plurality of sensors includes any of an optical sensor, a light detection and ranging sensor, a motion sensor, and an audio sensor.

18. The non-transitory computer-readable storage medium of claim 17, the operations further comprising:
- sending a prioritized sensor data message to the vehicle, the prioritized sensor data message including a request for prioritized sensor data from the plurality of sensors, the prioritized sensor data including a prioritized listing of the plurality of sensors using locations of the plurality of sensors; and
- receiving the sensor data from the vehicle in an order using the prioritized listing.

19. The non-transitory computer-readable storage medium of claim 17, the operations further comprising:
- generating image data using the sensor data;
- storing the image data in a database; and
- retrieving the image data when the data transfer rate satisfies the data transfer rate criterion, the optimized state data being generated using the retrieved image data.

20. The non-transitory computer-readable storage medium of claim 17, the operations further comprising:
- determining a transmission delay using a time interval between the plurality of signals being received; and
- in response to determining that the transmission delay satisfies a delay criterion, generating predictive data using state data previously received within a predetermined time period, the optimized state data being generated using the predictive data.

* * * * *